United States Patent [19]

Kim

[11] Patent Number: 5,138,993
[45] Date of Patent: Aug. 18, 1992

[54] ROTARY WAVY MOTION TYPE ENGINE

[76] Inventor: Jong Dae Kim, #319- Jeo-ri, Sunggeo-eub, Chonan-shi, Chungchongnam-do, Rep. of Korea

[21] Appl. No.: 653,322

[22] Filed: Feb. 11, 1991

[51] Int. Cl.⁵ .............................................. F02B 53/00
[52] U.S. Cl. ..................................... 123/228; 418/53
[58] Field of Search .................. 123/221, 228; 418/49, 418/53

[56] References Cited

U.S. PATENT DOCUMENTS

| | | | |
|---|---|---|---|
| 3,102,517 | 9/1963 | Day et al. | 418/53 X |
| 4,919,601 | 4/1990 | Kim | 418/51 |

FOREIGN PATENT DOCUMENTS

| | | | |
|---|---|---|---|
| 475138 | 10/1975 | Australia | 418/53 |
| 207400 | 2/1984 | German Democratic Rep. | 418/53 |

*Primary Examiner*—Michael Koczo
*Attorney, Agent, or Firm*—Low, Price, LeBlanc & Becker

[57] ABSTRACT

A rotary wavy motion type engine is disclosed, and the engine includes: a center housing 1 and side housing 2,2'. The center housing 1 is provided with an exhaust hole 1', and the center and side housing form a frame and an internal chamber. A disc shaped piston 4 having supporting 4a,4b is supported within a pair of arcuate recesses 2', 2a' of the side housings 2,2a. An inclined eccentric shaft 3 is rotatably secured to the disc shaped piston 4, and the other end of the shaft 3 is connected to an output shaft. The disc shaped piston 4 defines left and right chamber 5, 6, and nutation members 23,23' are attached upon and under the disc shaped piston 4 in such a manner that they should define an intaking compressing room 8 and a pressure releasing room 9. All of the above components are arranged in such a manner as to produce twisting wavy motions in the disc shaped piston.

2 Claims, 5 Drawing Sheets

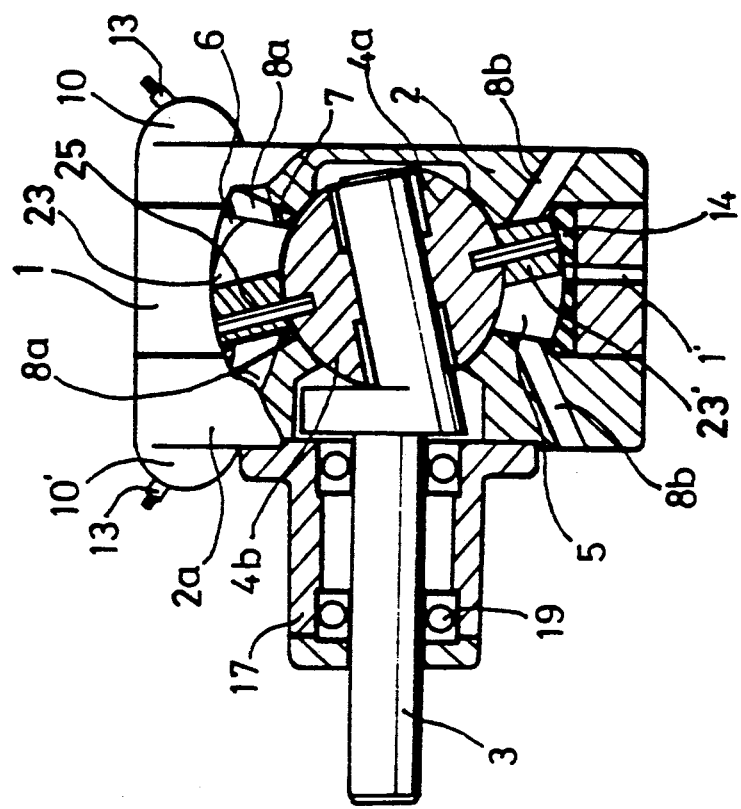

ROTARY WAVY MOTION TYPE ENGINE

FIELD OF THE INVENTION

The present invention relates to a waveform actuating machine having a tilting disc which is actuated in waveform by an eccentric shaft, such as disclosed in U.S. Pat. No. 4,919,601, issued Apr. 24, 1990 to the present inventor.

More particularly, the present invention relates to a rotary wavy motion type engine in which combustion chambers are formed at opposite sides of a disc shaped piston performing rotary wavy motions, so that intake, compression, combustion and exhaust strokes are alterantely carried out at the opposite sides of the disc shaped piston to increase the amount of the output per volume of exhaust gas, decrease noise and vibration, and make it easier to start the engine.

BACKGROUND OF THE INVENTION

Conventionally, internal combustion engines are thermo-dynamically classified into Otto cycle, Diesel cycle and Sabathe cycle, while they are operationally classified into 2-cycle engines and 4-cycle engines. These internal combustion engines are operated so that each piston in each cylinder performs an intake stroke, compression stroke, combustion stroke and exhaust stroke. The motions of the pistons are transmitted through connecting rods to a crank shaft, thereby converting the reciprocating movements to revolving motions. In these internal combustion engines, the pistons and the crank shaft undergo great variations of pressure and torque, and therefore, the engine receives severe impact and vibration, with the result that noises are severely generated, and that the abrasions of the mechanical parts are severe. Consequently, the upper and lower limits of the revolution speed are restricted, and if smooth operation in these internal combustion engines is to be realized, a large flywheel is required, with the result that the volume and the weight of the engine cannot be miniaturized. Further, due to the risk of causing back fire, high speed operation cannot be achieved.

Further, the intake time and exhaust time are very short, and therefore, the charging of the fresh air and discharging of the exhaust gas to and from the cylinder are incomplete, thereby reducing the output level.

Accordingly, a supercharger has to be used additionally, and further, the exhaust gas has to be discharged without having a combustion delaying effect, with the result that the thermal efficiency drops to a great degree.

In an attempt to overcome the above described disadvantages, the rotary engine was developed, but, in this rotary engine, the rotor and the eccentric shaft are connected through gears, with the result that noises are generated during driving. Further, air-tight sealing and lubrication between the rotor and the casing become difficult. If a malfunction occurs on the rotor or on the casing, it is difficult to repair. Manufacture is also difficult.

SUMMARY OF THE INVENTION

The present invention is intended to overcome the above described disadvantages of the conventional engines.

Therefore it is an object of the present invention to provide a rotary wavy motion type engine in which: combustion chambers are provided at the opposite sides of a disc shaped piston; combustion and exhaust occur in the combustion chambers in an alternate manner; the wavy motion of the disc shaped piston is converted into revolutions of a shaft through an inclined eccentric shaft; thus four strokes of the piston are performed during one revolution of the shaft so as for a two-cycle engine to be formed, and so as for a high level of output to be obtained per volume of the exhaust gas; there is no crank shaft and no connecting rod so as for the mechanical loss to be minimized; intake and compression, and combustion and exhaust are simultaneously carried out, as well as conforming to the inertia, so as for a high speed revolution to be possible; a fly wheel is not required so as for the volume and weight of the engine to be minimized; there is no variation of the torque so as for the noise and vibration to be minimized; and the starting of the engine is easy.

BRIEF DESCRIPTION OF THE DRAWINGS

The above object and other advantages of the present invention will become more apparent by describing in detail the preferred embodiments of the present invention with reference to the attached drawings in which:

FIG. 6 is an exploded perspective view of another embodiment of the rotary wavy motion type engine and FIG. 7 is an axial sectional view of the construction of the engine of FIG. 6.

DESCRIPTION OF THE PREFERRED EMBODIMENT

Figure 1:
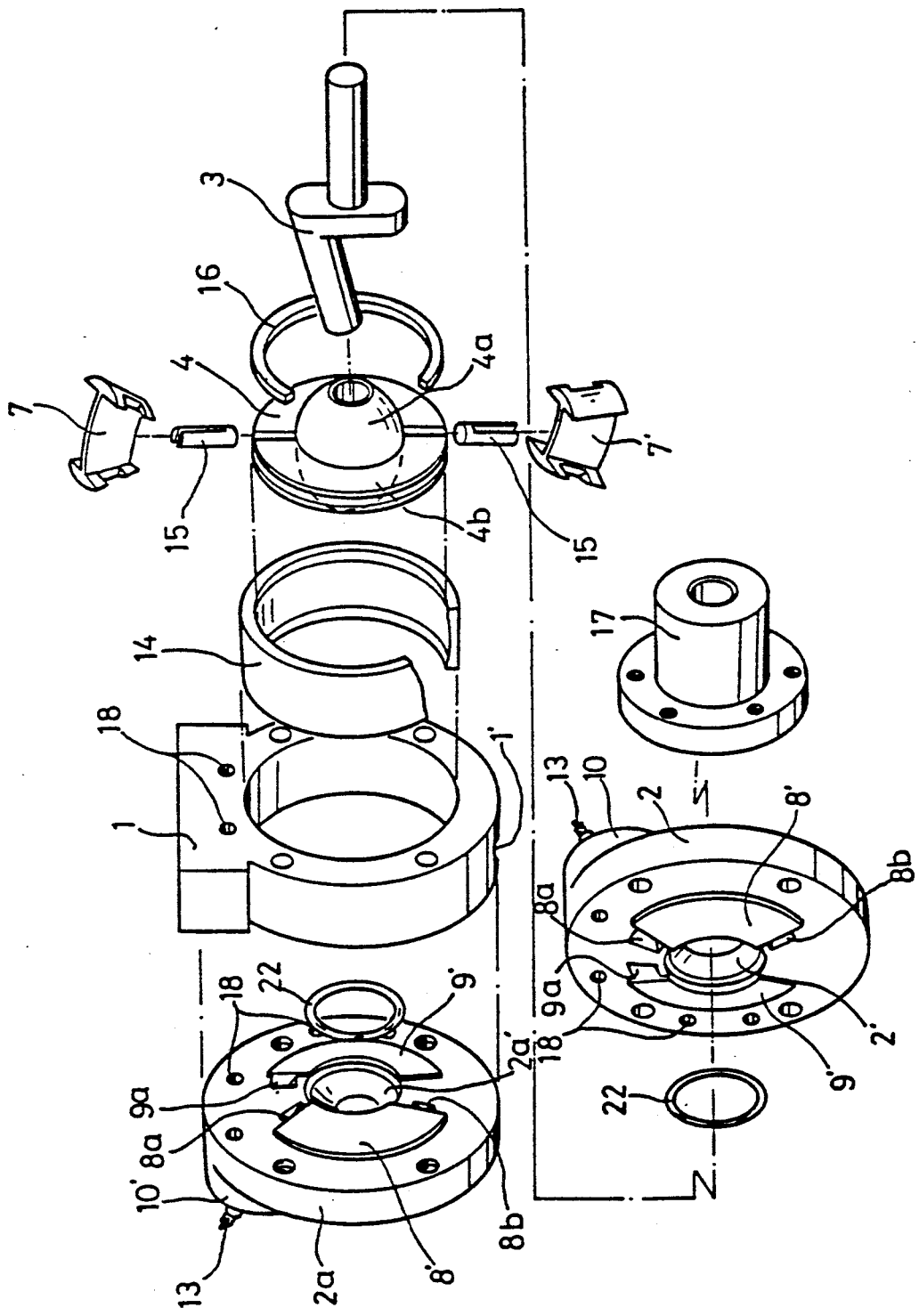
FIG. 1 is an exploded perspective view of the rotary wavy motion type engine according to the present invention.
Figure 2:
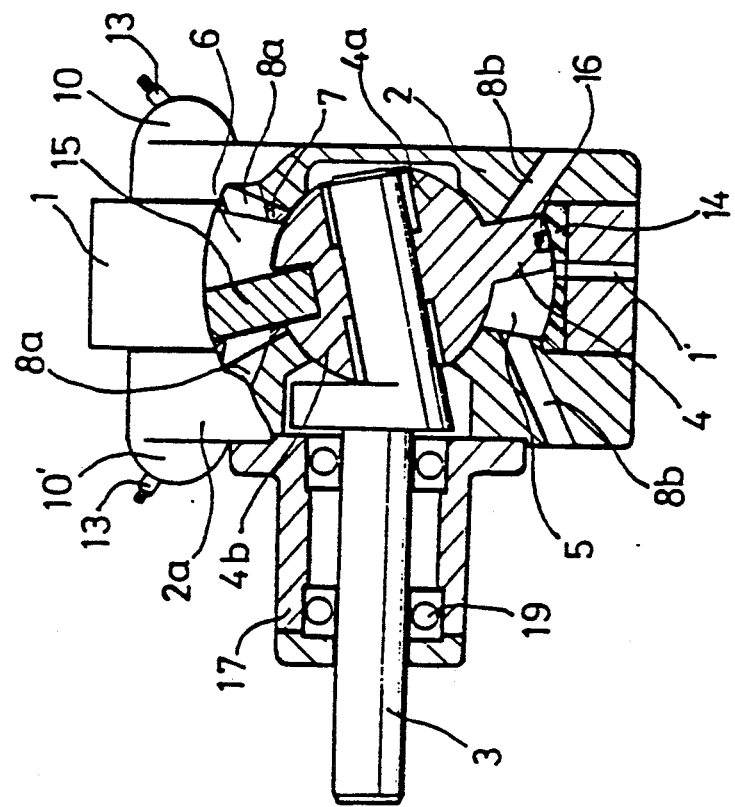
FIG. 2 is an axial sectional view of the construction of the engine according to the present invention.

The present invention includes, with reference to FIGS. 1 and 2, a centre housing 1 having an exhaust hole 1' at the centre of the bottom thereof, and side housings 2,2a having combustion chambers 10,10', respectively. A disc shaped piston 4 is connected to an inclined eccentric shaft 3 and has sliding portions 4a, 4b, fitted into arcuate recesses 2',2a' respectively formed in the side housings 2,2a. Left and right combustion chambers 5,6 (FIG. 2) are defined by the rotary disc shaped piston 4, and the inclined eccentric shaft 3 is revolved by the rotary wavy motions of the disc shaped piston 4.

Figure 3:
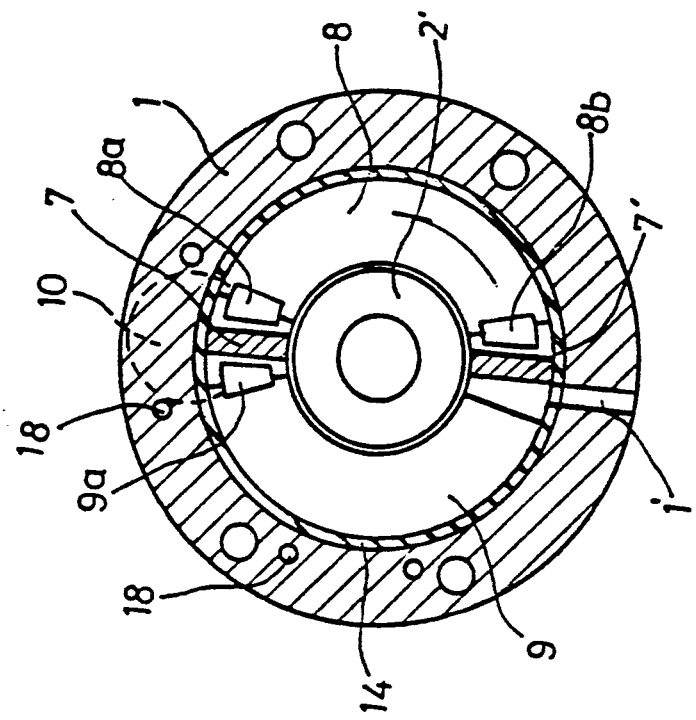
FIG. 3 is a cross sectional view of the construction of the side housing of the rotary wavy motion type disc piston according to the present invention.

There are installed isolating plates 7,7' (FIG. 3) at the upper and lower positions of the disc shaped piston 4 so that the left and the right combustion chambers 5,6 are each divided into an intake compression room 8 and a pressure releasing room 9 (FIG. 3). The side housings 2,2a have conical surfaces 8' and 9' which are adapted to be contacted in line by each side of the disc portions of the piston 4, in the same inclination angle as that of the disc shaped piston. A compression hole 8a and a pressure releasing hole 9a (FIG. 3) are formed in such a manner that they open into the combustion chambers 10,10'.

Figure 4:
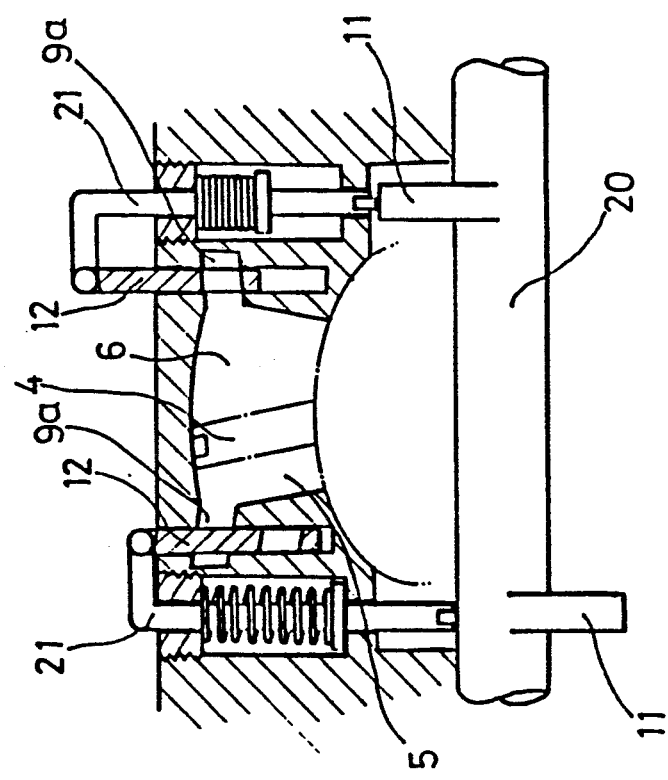
FIG. 4 illustrates the construction of a valve installed at the pressure releasing hole of the combustion chamber of the present invention.

Intake holes 8b are formed on the bottom of the intake compression room 8, and the pressure releasing hole 9a is provided with a valve 12 (FIG. 4) which is operated by a cam 11, with a check valve being installed on the compression hole 8a, thereby making it possible to control the compression and combustion strokes.

In the drawings, reference numeral 16 indicates a ring for maintaining an air-tight sealing; 17 indicates a bracket for supporting the revolution shaft; 18 indicates cooling water holes; 19 indicates a bearing; 20 indicates a cam shaft; 21 indicates a cam rod; and 22 indicates a bush.

Hereinbefore, the present invention has been described in view of the applicability of said U.S. Pat. No. 4,919,601 to the wavy motion type engine.

Figure 6:
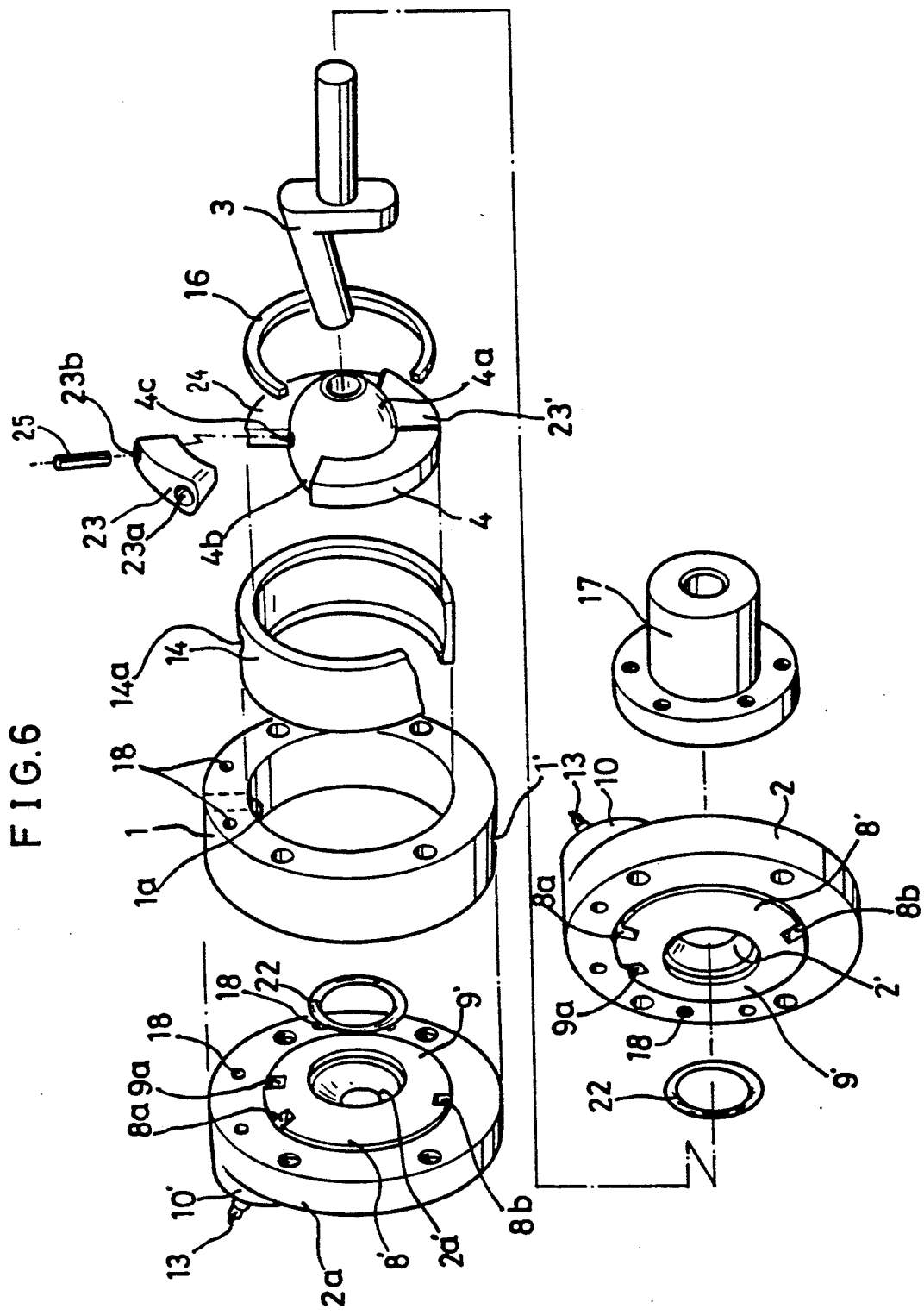

FIG. 6 illustrates the most preferred embodiment of the present invention wherein the isolating plates 7 and 7' of the previous embodiment are substituted by simple motion solid members, for example, nutation members 23 and 23' which are more adaptive for use in engine circumstances. Accordingly, the disc shaped piston 24 has been cut away at its diametrically opposite portions to accommodate the members 23 and 23'.

The members 23 and 23' are slidably mounted between the sliding portions 4a,4b of the piston 24 and a liner 14, which is disposed in the center housing 1 and has an inner arcuate surface for sliding contact with the members 23,23' as well as the disc shaped piston 24. Each of the members 23,23' has at its opposite ends two holes 23a and 23b through which sliding rods (only one is shown at 25) are snugly inserted. At the center of the upper portion of the center housing 1, there is formed a hole 1a in such a manner as to be disposed on the line between the compression hole 8a and the pressure releasing hole 9a.

The sliding rod 25 is inserted through the hole 23b into a slot 4c in the sliding portion 4a and another through the hole 23a into an opening 14a in the liner 14 as well as the opening 1a in the center housing 1 allowing a smooth and stable wavy motion of the disc piston 24.

In addition, the left and right faces of the member 23 at the side of 23a are always closely contacted with inner faces 8', 9' of the side housinge 2,2a so that the compression hole 8a and the pressure releasing hole 9a are isolated from each other. The lower nutation member piece 23' is coupled with only the disc shaped piston 24, so that the nutation member moves to isolated the exhaustion hole 1' and the intake hole 8b from each other.

Therefore, the disc shaped piston 24 and the nutation members 23,23' cooperate to divide the air chamber in the engine into a pair of variable volume compression rooms 8 and a pair of variable volume pressure releasing rooms 9.

The rotary wavy motion type engine of the present invention constituted as above will now be described as to its operation and effect.

In a state with the supporting/sliding portions 4a,4b supported by both of the side housings 2,2a, and with the inclined eccentric shaft 3 movably installed as shown in FIG. 7, if the eccentric shaft 3 is rotated to twist the disc shaped piston 24 so causing the wavy twisting motions, then the contact line between the disc shaped piston 24 and the side housing 2 moves from the side of the intake hole 8b in the direction of the arrow mark of FIG. 3. At the same time, the fresh air within the intake compression room 8 is pressure-transferred to the combustion chamber 10, and at the same time, external fresh air is sucked into the intake compression room 8 for the next cycle.

Under this condition, the compression hole 8a with a check valve is opened as a result of the pressure of the compressed air in the intake compression room 8, so that the fresh air will be introduced from the intake compression room 8 into the combustion chamber 10. (At this time, the contact line of the disc shaped piston 24 arrives at the point A' in FIG. 5.)

When the contact line between the disc shaped piston 24 and the side housing 2 arrives at the compression hole 8a, and consequently, the fresh air of the intake compression room 8 is completely delivered to the combustion chamber 10, the compression hole 8a is automatically closed due to the function of the check valve, and the injection of fuel and the sparking of an ignition plug 13 cause combustion, thereby expanding the gas within the combustion chamber 10 which expansion nutates the piston 24 to rotate the output shaft.

Under this condition, when the contact line between the disc shaped piston 24 and the side housing 2 arrives at the front of the pressure releasing hole 9a after passing the nutation member 23, the pressure releasing hole 9a is opened due to the function of the valve 12, and at the same time, the combustion gas of the combustion chamber 10 is expanded into the pressure releasing room 9 which further pushes the disc shaped piston 4, (24). Then the contact line between the disc shaped piston 24 and the side housing 2 arrives at the exhaust hole 1' to exhaust any waste gases out of the engine which completes one revolution cycle of the shaft 3.

Also, the similar work is performed in between the piston 24 and the side housing 2a at the angular distance of 180° because the contact lines between the disc shaped piston 24 and each of the side housings 2, 2' are formed at diametrically opposite positions, whereby the combustions occur alternately in the left and right chambers 5,6 per half revolutions (180°) of the inclined eccentric shaft 3; thus the combustions are carried out in a continuous double acting manner.

Figure 5:
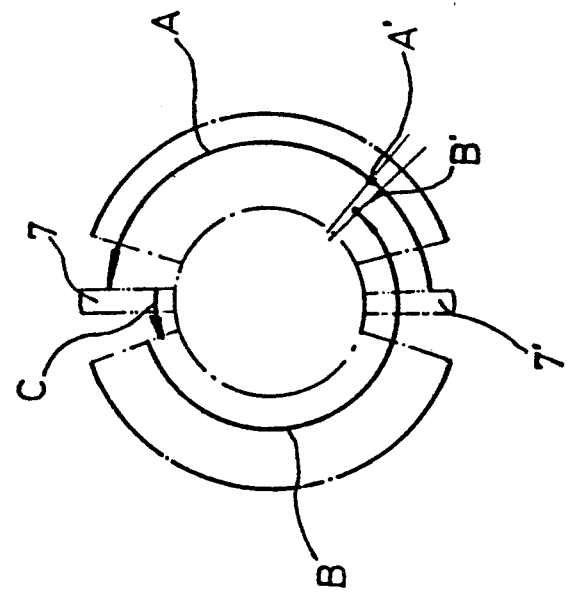
FIG. 5 illustrates the respective operating steps, i.e., the respective strokes, and the valve of the combustion chamber of the present invention.

Referring to FIG. 5, during the time when the contact line between the disc shaped piston 24 and the side housing 2 moves along the arrow mark A, the intaking and compressing processes are carried out, while if the contact line arrives at the point A', the compression hole 8a is opened due to the compressing force.

The arrow mark C represents the combustion process, and during this process, both the compression hole 8a and the pressure releasing hole 9a are closed. The angular interval B represents the expanding process, and in this process, the compression hole 8a is closed, with only the pressure releasing hole 9a being open.

According to the present invention as described above, intake, compression, combustion and exhaust arise alternately at the opposite sides of the disc shaped piston, thereby forming a double acting operation. Therefore, a higher power output can be obtained per volume of the exhaust gas.

Further, the intake compression room 8 and the pressure releasing room 9 are separately provided, and therefore, the supply of the fresh air is reliably conducted. Further, for the same reason, a lengthened combustion is effected, and the thermal efficiency is improved, there being no fluctuations in the output level of the engine. Further, due to the absence of the crank shaft and connecting rod, mechanical loss and noise are minimized. Further, there is no variation of torque, and therefore there is no vibration. Further, the rotary disc shaped piston performs twisting wavy motions, and therefore, the stress acting on it is dispersed, thereby excluding the possibility of engine damage. Further, the impact energy loss becomes minimal by rhythmically utilizing the inertia energy which accumulates on the disc shaped piston. Further, when the combustion gas of the combustion chamber is expanded into the pressure releasing room, the action of the expanding gas conforms to the inertia, with the result that a high speed operation becomes possible.

The expanding process durates over 180° at each side, and therefore, if both of the sides are added together, it is equivalent to saying that the expanding process (the pressure releasing process) continues over an angular interval of 360°. Accordingly, a fly wheel is not required, thereby making it possible to minimize the bulk and weight of the engine.

Further, the combustion occurs per angular interval of 180°, and therefore, the starting of the engine becomes easier.

What is claimed is:

1. A rotary wavy motion type engine comprising:
   a center housing (1) having a cylindrical cavity in which a liner (14) having a band-like spherical surface is inserted, said center housing and said liner including at least one exhaust hole (1'), respectively;
   a left housing (2) having a conical surface (8') which forms a bearing bore with an inner arcuate recess (2');
   a right housing (2a) symmetrical to said left housing (2) having a conical surface (9') which forms a bearing bore with an inner arcuate recess (2a'), said center housing and said left and right housings being assembled to form an air chamber;
   a compression hole (8a), a pressure releasing hole (9a), and an intake hole (8b) formed in each of said conical surfaces (8',9') of said left and right housings (2,2a);
   a pair of combustion chambers (10,10') respectively formed on upper portions of said left and right housings (2,2a), and valves for enabling each of said combustion chambers (10,10') to communicate with said compression hole (8a) and pressure releasing hole (9a);
   a disc shaped piston (24) having a bearing dome (4a or 4b) on each side, said piston (24) being inserted in said liner (14) with said bearing domes supported within said inner arcuate recesses of said left and right housings, said piston being journaled to an eccentric shaft (3) and provided with cut sections at diametrically opposite portions thereof, and a pair of nutation members (23,23') mounted within said cut sections, respectively;
   a first of said nutation members (23) having a first means for receiving an insertion pin (25) connected to said disc shaped piston (24) and a second means for receiving another insertion pin connected to said center housing (1) and said liner (14), whereby said first nutation member (23) is slidable between said liner and bearing domes to provide the nutating operations of said piston (24); and
   the second of said nutation members (23') being attached to said disc shaped piston for isolating one of said intake holes (8b) from said exhaust hole (1') of said center housing (1).

2. A rotary wavy motion type engine as claimed in claim 1, wherein said first nutation member (23) can pivot on said insertion pin connected to said center housing (1) while closely abutting an area of the conical surface (8',9') between said compression hole (8a) and pressure releasing hole (9a) to isolate them from each other so that said disc shaped piston and said nutation members cooperatively divide said air chamber into a pair of variable volume compression rooms (8) and a pair of variable volume pressure releasing rooms (9).

* * * * *